United States Patent [19]
Paul

[11] Patent Number: 5,320,258
[45] Date of Patent: Jun. 14, 1994

[54] INLET PORT FOR ROTARY FEEDERS

[76] Inventor: Kermit D. Paul, 1031 Sunset View Dr., Bethlehem, Pa. 18017

[21] Appl. No.: 697,826

[22] Filed: May 9, 1991

[51] Int. Cl.$^5$ ............................................. G01F 11/10
[52] U.S. Cl. ..................................... 222/345; 222/368
[58] Field of Search ................ 222/342, 345, 347, 355, 222/344, 349, 367, 368, 564; 414/219, 220, 301

[56] References Cited

U.S. PATENT DOCUMENTS

| | | | |
|---|---|---|---|
| 1,869,120 | 7/1932 | Thoeming et al. | 222/368 X |
| 2,816,643 | 12/1957 | Greaves et al. | 222/368 X |
| 3,052,383 | 9/1962 | Transeau | 222/368 X |
| 3,118,575 | 1/1964 | McCauley | 222/368 X |
| 3,659,754 | 5/1972 | Barone et al. | 222/368 |
| 4,537,333 | 8/1985 | Bjerregaard | 222/368 X |
| 4,823,993 | 4/1989 | Siegel et al. | 222/345 |
| 4,986,455 | 1/1991 | Rambold | 222/368 |
| 5,114,053 | 5/1992 | Beirle | 222/368 X |

FOREIGN PATENT DOCUMENTS

| | | | |
|---|---|---|---|
| 2107948 | 8/1972 | Fed. Rep. of Germany | 222/368 |
| 2091672 | 8/1982 | United Kingdom | 222/368 |

*Primary Examiner*—Andres Kashnikow
*Assistant Examiner*—Kenneth DeRosa

[57] ABSTRACT

The present invention is directed to a rotary feeder device for transporting bulk shearable material. The rotary feeder comprises a main housing with a cylindrical passage therethrough, and an inlet port and a discharge outlet each communicating with the cylindrical passage of the main housing. There is a rotor disposed within the cylindrical passage that includes a plurality of pockets spaced peripherally thereabout which rotate successively past the inlet port and discharge outlet which are each defined by a pair of radially-extending rotor blades. The inlet port feeds material directly into the rotating pockets. At the very end of inlet port that is located directly above the rotating pocket area there is located anti-shearing edges that come in close communication with the outer free edges of the rotor blade as the latter rotate. The outer free edges of the rotor blades are located at a sufficient angle from the axial axis of the rotor so that any shearable material disposed partly within the inlet port and partly within a rotor pocket will not be sheared by the co-action between said edges of the inlet port and the leading edges of the rotor blades as they move from under the inlet port. Furthermore, the edges of the inlet port have a cavity provided underneath their front portion into which the partly disposed material is pushed by the rotating blade. The cavity leads into a pocket for the partly disposed material located near or on the inner wall of said housing. The edge of the rotor blades will serve to push the shearable material disposed in the cavity into the pocket.

4 Claims, 3 Drawing Sheets

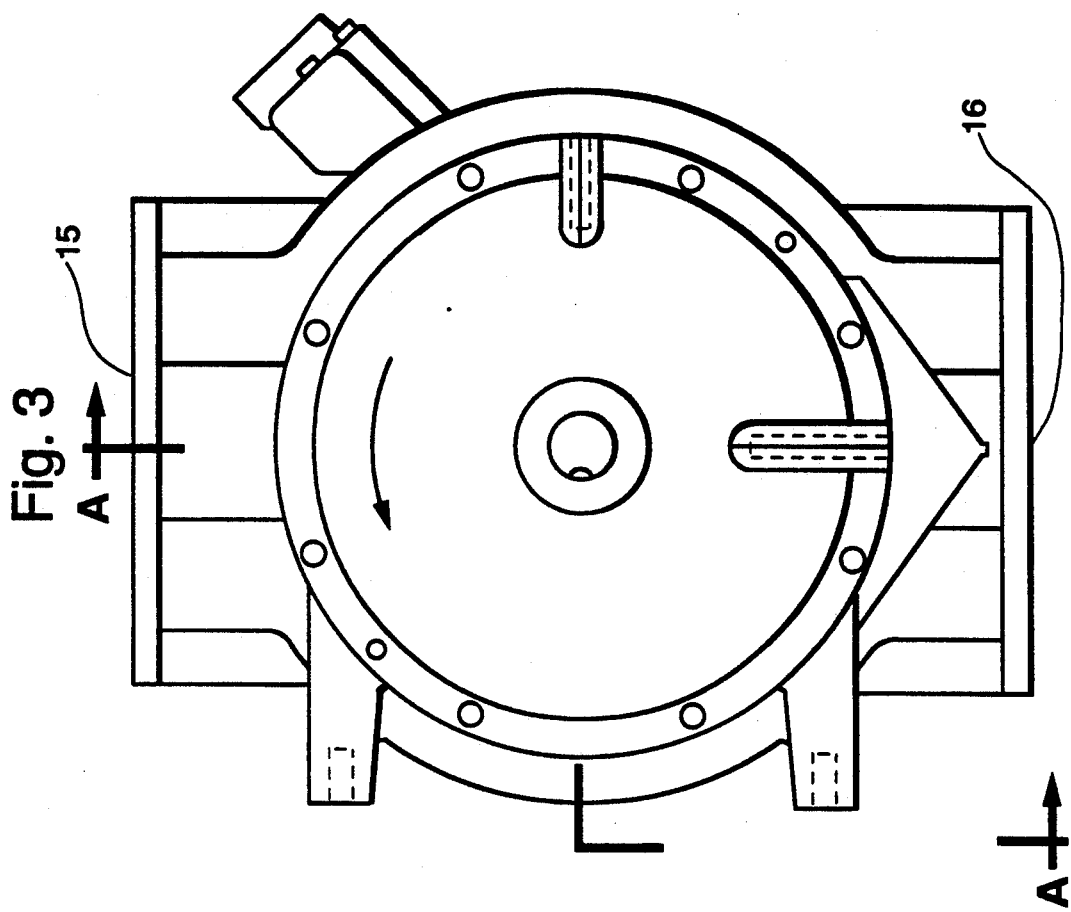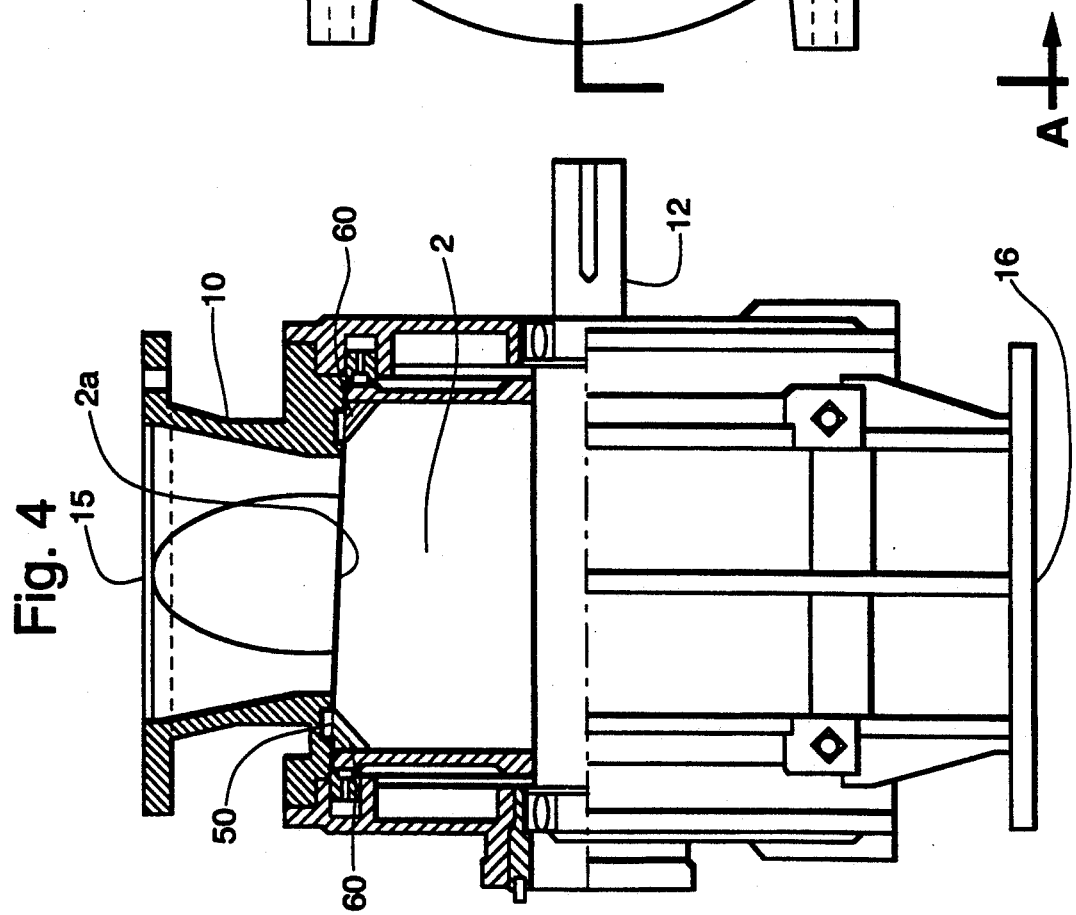

INLET PORT FOR ROTARY FEEDERS

This invention relates generally to rotary feeder mechanisms of the type wherein a circumferentially compartmentalized rotor part is revolubly journalled in a surrounding housing or stator part having inlet and outlet openings at opposite sides of the rotor which are successively traversed by the several rotor compartments to transfer material delivered into the inlet opening of the feeder to the outlet opening thereof and more particularly to improvements in the design of the inlet port of the feeder.

In particular, the present invention is directed to an inlet port design that facilitates the introduction of granular material, and most particularly pelletized plastic resin, into the rotary feeder.

Heretofore and prior to the present invention, it has been a serious problem to insure an adequate fit between the rotor blades and the inner wall of the stator as is necessary where the feeder mechanism is employed in e system requiring the maintenance of a pressure differential between the inlet and outlet parts of the mechanism, that is, across the rotor part thereof. It has been found that when attempts are made to machine the rotor and stator for close rotating fit of the rotor blades within the stator, even a slight eccentricity of the rotor relative to the stator can result in serious jamming of the rotor during operation of the feeder mechanism. Moreover, when handling certain kinds of material, such as, for example, pellets of polyethylene or other plastic or gummy materials, jamming of the rotor within the stator may occur even though the parts of the feeder mechanism are perfectly concentric. This jamming of the feeder mechanism by the material being handled results from the fact that as the rotor blades successively move across the opening at the bottom of the intake port they necessarily pass through a mass of material which is disposed partially in said port and partially in a rotor pocket that is in immediate communication with the port and in so doing the outer edges of the rotor blades sweep some of such material beyond the inlet port opening where it can become wedged between the rotor blades and the internal wall surface of the stator. This wedging of material between the edges of the rotor blades and the cylindrical wall of the rotor housing (the stator) places a heavy load on the driving mechanism, slowing the rotor and at times bringing it to a complete halt, attended, of course, by the possibility of mechanical breakdown of the apparatus and other serious consequences due to the strains set up by the jammed rotor.

Thus, it is generally known that certain granular material such as pelletized plastic resin can have a dramatic effect on the operation of a rotary feeder if the feeders' inlet port is not properly designed to accommodate this coarse granular material. For example, a high impact condition occurs if the entire outer length of the rotor blade or vane simultaneously passes by the end of the inlet port. This impact occurs each time a vane crosses the end of the inlet port and is caused by the shearing of pellets caught in the pinch point between the outer free edges of rotor blade and the body (stator) of the rotary feeder. The added stress on the rotor, bearings and drive train components can increase maintenance requirements; therefore, it is desirable to reduce or entirely eliminate this condition.

One common way of reducing the impact is to place the leading edge of the vane and the edge of the inlet port at slight angles to each other. This results in a scissor-like action on the material which reduces the magnitude of shearing impact but doesn't reduce the amount of pellets which are sheared as the blades pass by the end of the inlet port. These sheared pellets can cause degradation of the final product.

The present invention is directed toward a rotary feeder device which is suitable for the introduction or removal of granular materials from a processing device. The rotary feeder comprises a main housing having a cylindrical passage therethrough. The axis of the cylindrical passage extends transverse to the flow of material through the device. The device further has inlet and outlet means that communicate with the cylindrical passage and a rotor disposed within the cylindrical passage having a plurality of radially extending vanes or blades which define material transporting compartments therebetween. The compartments are located peripherally about the rotor and rotate successively past the inlet means or port and the discharged means or outlet as the rotor rotates. It is a particular feature of this present invention that the bottom edges of the inlet port that are positioned to come into a close communication with the rotating outer free edges of the rotor blade are positioned at a sufficient angle from the longitudinal axis of the rotor so that any shearable material that is disposed partly within the inlet port and partly within a rotor pocket will not be sheared when squeezed by the co-action between the edges of the inlet port and the leading edges of the rotor blades as they move together. It is an additional feature of the present invention that the edges of the inlet port have a cavity cut away underneath the edge thereof that can accomodate said partly disposed material and into which the partly disposed material will be pushed by the moving edge of the rotor blade. The cavity extends underneath the entire length of the edge of the inlet port and emptys into at least one pocket for the partly disposed material that is located in or adjacent to the inner wall of the rotor.

The partly disposed material will be pushed into the cavity located under the edge of the inlet port by the moving rotor blade along the length of the inlet port edge. As the blade rotates it will continue to push the material along the cavity and into the pocket located at or near the inner stator wall of the rotor. The pocket is self-cleaning, in the material in the pocket will then empty by gravity into the next compartment that rotates into position underneath the pocket.

The invention is further depicted in the appended drawings,

FIG. 3 is a side view of the rotary feeder of the present invention;

FIG. 4 is a side cut-away taken along lines A—A of FIG. 3.

In these several figures, like elements are denoted by like reference characters.

Figure 1:
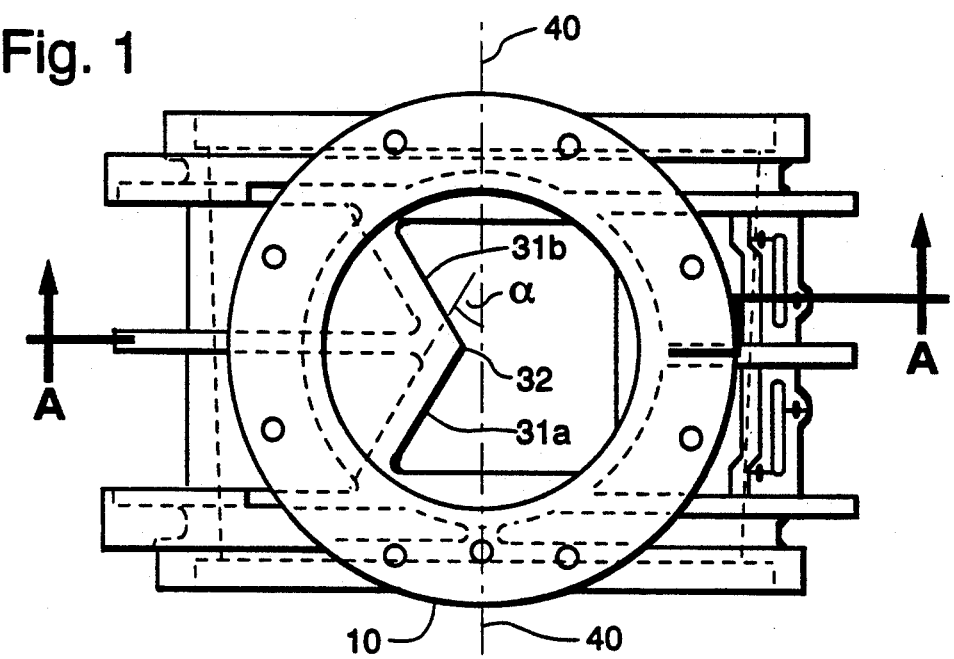
FIG. 1 is a top view of the rotary feeder according to the present invention.
Figure 2:
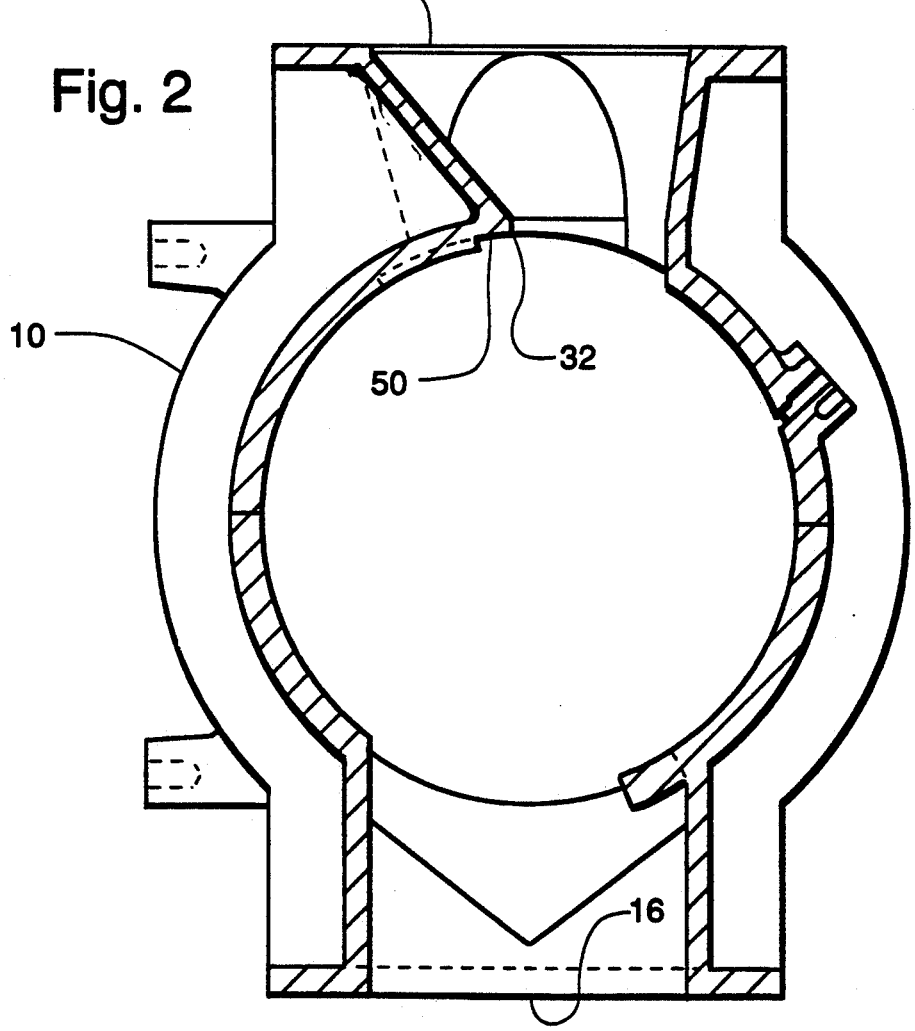
FIG. 2 is a cross-sectional view of the rotary feeder according to the invention taken along lines A—A of FIG. 1.

Referring now to the drawings, and first to FIGS. 1-4 there will be seen a rotary feeder comprising generally a hollow cylindrical body member or main housing 10.

Although only one is depicted in the FIG. 1, there are a plurality of rotor blades 2 fitted within the housing 10. These blades have an edge 2a which will come into communication of one such rotor blade being with the bottom of inlet port 15. There is a shaft 12 which passes axially through the rotor and by means of which the latter is rotated. Extending upwardly and downwardly from hollow cylindrical portion of the main housing 10 are, as indicated, an inlet port 15 and a discharge outlet 16.

At the bottom of the inlet port 15 immediately adjacent to the rotating area of the rotary feeder device of the present invention there is located the anti-shearing edges 31a and 31b of the inlet port, which, in the V shaped configuration depicted, meet at the vertex 32 of the V shaped edges.

Figure 5:
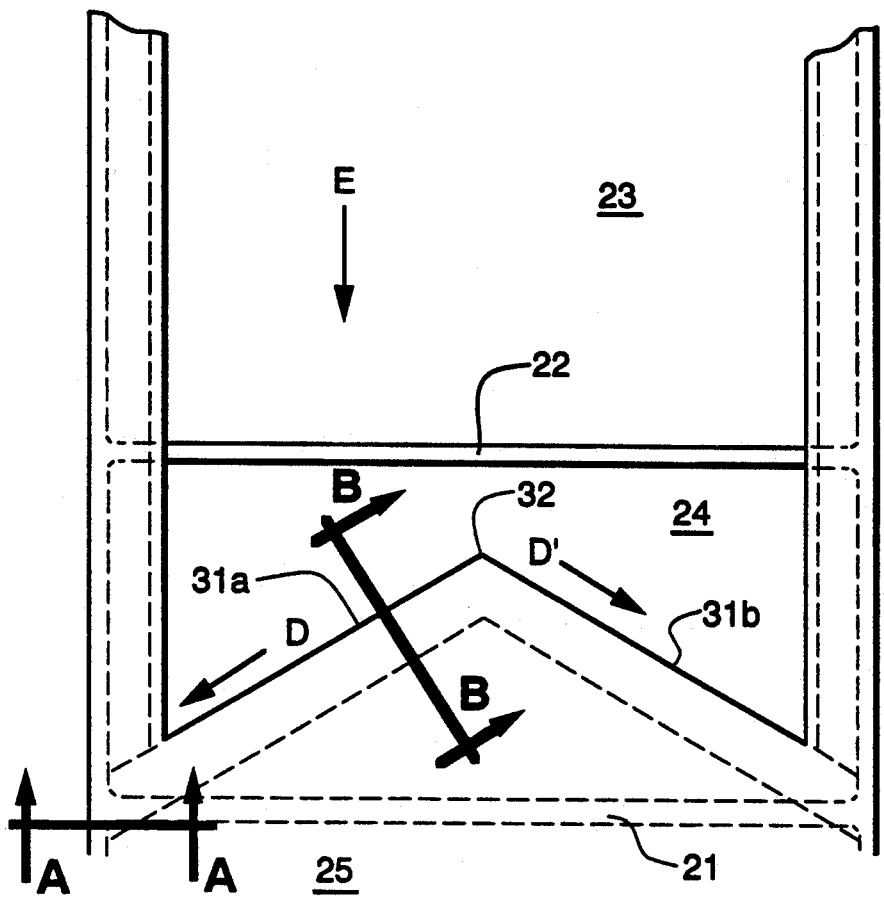
FIG. 5 is another top view of the inlet port of the present invention.

The rotor is formed by the radially projecting blades 2 into a plurality of material transporting compartments, three of which are shown in FIG. 5 and are numbered 23, 24 and 25, spaced uniformally around the rotor periphery, each of the compartments being generally V-shape in cross section with its opened end presenting outwardly of the rotor access. The width of each of the compartments is preferably somewhat greater than the diameter of the actually aligned inlet port 15 and a discharge outlet 16, so that when the compartment is located directly beneath the inlet port or directly above the discharge outlet the edges 21 of the rotor blades always lie beyond the edges of the inlet 15 and outlet 16. As previously pointed out, when conduit material, as for example polyethylane pellets, are passed through the rotary feeder some of these pellets will take up positions wherein they lie partly within the rotor compartment and partly within the inlet port, thereby creating the possibility of jamming the feeder mechanism by becoming wedged between the continuous edges of the rotor partitions and the inside cylindrical surface in the main housing 10. In the past, it was suggested that this problem could be overcome by forming the bottom of the inlet port that is closest to the entry to the rotor area into a shearing element, which comprised edges placed at an angle relative to the edges of the rotor blades so that any of the conduit material which is disposed between the cutting edges of the shearing element and the top of the rotor blades is readily cut through as a leading edge of each rotor blade traverses the shear element during a rotation of the rotor. However, even though the sheared material may not necessarily jam the rotor, its presence is disadvantageous in that it degrades the overall quality of the product being transfered via the rotary feeder.

In the present invention, edges are placed at the bottom of the inlet port immediately above the entry to the rotor areas. These edges have an anti-shearing effect on the partly disposed material which they contact in conjunction with the edges of the rotor blades, in that they are disposed at an angle, represented in FIG. 1 by the letter a, relative to the longitudinal (axial) axis 40 of the rotor, which angle is high enough so that when the rotor blade comes into contact with any of the conduited material which is disposed between an edge of the bottom of the inlet port and the top of the rotor blades the material is not sheared but is pushed into a cavity 50 that is disposed underneath an edge of the inlet port. The angle at which the inlet port edges are so disposed relative to the longitudinal axis of the rotor at which this anti-shearing and pushing effect will take place will be dependent on the nature of the material being transported. For example, when the material is plastic polyethylene pellets the required angle will be approximately 30°, as angles that are significantly more acute, for example, 15°, will cause the pellets to be clipped when they ape compressed between the rotor blade and the pellets are then pushed by the rotation of the rotor blade into a depression or pocket 50 set forth in or near the inner wall or the stator which is in communication with the cavity. The volume of the depression in the stator is always sufficient to accomodate all the pellets that are lodged in the cavity.

The invention is further depicted in FIG. 5, which illustrates rotor blade edges 21 and 22, which in concert define compartment 24. Edge 21 is the leading edge of compartment 24 as it travels in the direction specified by arrow E toward the edges 31a and 31 b of the inlet port and directed toward the outside vertex 32 of the V. Put another way, the blades will move from the vertex of the V toward the divergent ends of the V. In FIG. 5, edge 21 has passed beneath the inlet port edges and is therefore drawn in relief). Compartment 23 is defined by blade edge 22 and another rotor blade edge not shown and compartment 25 is defined by edge 21 and a leading edge not shown. As indicated in Figure 5 the edges of the inlet port are disposed in a V formation, although other configurations can be utilized. In such a configuration, the rotor blade leading edges will always be moving toward the outer vertex 32 of the V.

Figures 5A, 5B:
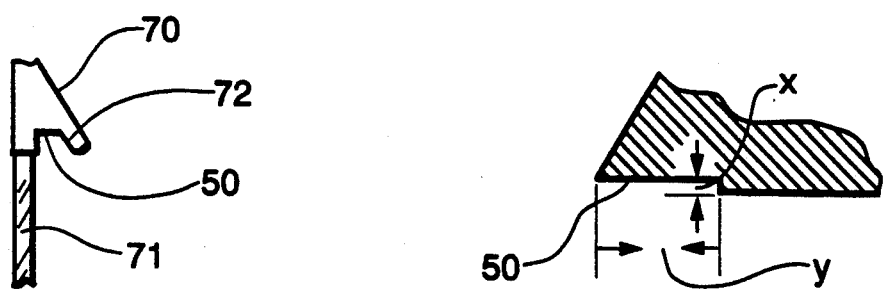
FIGS. 5a and 5b are views taken along, respectively, lines A—A and B—B of FIG. 5 in the indicated direction.

As indicated, the edges of the inlet port are disposed at an angle relative to the longitudinal axis of the rotor. The angle is of a sufficient degree so that any material that is partly disposed between the inlet port and the pockets of the rotor will not be sheared by the interaction between the leading edge of the rotor blade and the edges of the rotor but will be pushed under the intake port edges 31a and 31b into a cavity. The material will subsequently be pushed through the cavity in the directions specified by arrows D and D' and will come to rest in two pocket areas 50 (not depicted in FIG. 5) located in or near each side wall of the stator in the vicinity of each of the divergent ends of the V. The material will then fall by gravity into the next rotating compartment that passes underneath the pocket areas FIG. 5A, taken along lines A—A shows one embodiment of how a pocket 50 is located near inner stator wall 71 under a shelve 72 along side wall 70 of the inlet port 15.

The cavity is illustrated in greater detail in FIG. 5, which is a horizontal cross-sectional view taken along lines B—B of FIG. 5. The depth x and length y of the cavity will depend upon the nature of the material being passed through the rotary feeder. The area in the cavity should be sufficient to accomodate any material in the immediate vicinity of the overhanging edge which is partly disposed between a rotating compartment and the inlet port. As the outer edge of the blade moves away from the vertex 32 of the V in direction E, it will push any material located in the cavities in the directions specified by the arrows D and D'. Eventually, the partly disposed material will be pushed from the cavity into a depression located either adjacent to or within the inner shroud of the housing (or stator).

The area of the pocket will be sufficient to accomodate all the material that is pushed underneath the cavity. The material will then fall from the pocket into the next open compartment of the rotor that passes underneath the pocket.

I claim:

1. A rotary feeder device for conduited bulk shearable material comprising a main housing having an outer and inner wall and a cylindrical passage therethrough, the cylindrical axis of which extends transversely to the flow of material, an inlet port and a discharge outlet each communicating with the cylindrical passage of the main housing, a rotor disposed within said cylindrical passage and adapted to rotate therein about a longitudinal axis, said rotor including a plurality of pockets spaced peripherally thereabout which rotate successively past the inlet port and discharge outlet as said rotor rotates, each of said pockets being defined by a pair of angularly spaced, radially-extending rotor blades, said inlet port having edges that are positioned at a sufficient angle from the longitudinal axis of the rotor so that upon their cooperation with the outer free edges of the rotor blade, upon rotation of the rotor any shearable material that is disposed partly within the inlet port and partly within a rotor pocket will not be sheared by the co-action between said edges of the inlet port and the outer free edges of the rotor blades as they move across the inlet port but will be pushed into a cavity for said shearable material located underneath the edge of the inlet port, said cavity being in communication with a depression for accommodating said shearable material located in the side inner wall of said housing, whereby the edge of said rotor blades will push the shearable material disposed in the cavity into said depression.

2. The rotary feeder of claim 1 wherein the edges of the inlet port are V shaped and said rotor blades move progressively from the vertex of the V to the divergent ends thereof.

3. The rotary feeder of claim 1 wherein the material is plastic pellets.

4. The rotary feeder of claim 3 wherein the edges of the inlet port are disposed at an angle of approximately 30° from the longitudinal axis of the rotor.

* * * * *